(12) United States Patent
Churchill et al.

(10) Patent No.: US 8,821,117 B2
(45) Date of Patent: Sep. 2, 2014

(54) TURBINE APPARATUS

(75) Inventors: Frédérick Churchill, Montréal (CA); Jean Perron, Chicoutimi (CA); Guy Fortin, Jonquière (CA)

(73) Assignee: Organoworld Inc., Quebec (CA)

( * ) Notice: Subject to any disclaimer, the term of this patent is extended or adjusted under 35 U.S.C. 154(b) by 785 days.

(21) Appl. No.: 12/996,276

(22) PCT Filed: Jun. 5, 2009

(86) PCT No.: PCT/CA2009/000797
§ 371 (c)(1),
(2), (4) Date: Apr. 22, 2011

(87) PCT Pub. No.: WO2009/146557
PCT Pub. Date: Dec. 10, 2009

(65) Prior Publication Data
US 2011/0189006 A1    Aug. 4, 2011

(30) Foreign Application Priority Data
Jun. 5, 2008    (CA) ..................................... 2633876

(51) Int. Cl.
*F01D 25/24*    (2006.01)
(52) U.S. Cl.
USPC ...................................... 415/211.2; 415/222
(58) Field of Classification Search
USPC ............... 290/44, 55; 415/62, 66, 189, 211.2, 415/213.1, 222, 228
See application file for complete search history.

(56) References Cited

U.S. PATENT DOCUMENTS

| 1,783,669 | A | * | 12/1930 | Oliver | ............................ 415/4.5 |
| 4,021,135 | A | * | 5/1977 | Pedersen et al. | ........... 415/208.2 |
| 4,218,175 | A | | 8/1980 | Carpenter | |
| 6,710,468 | B1 | * | 3/2004 | Marrero O'Shanahan | ..... 290/55 |

(Continued)

FOREIGN PATENT DOCUMENTS

CA    2 633 876 A1    12/2009
EP    0 935 068 A2    8/1999

(Continued)

OTHER PUBLICATIONS

International Preliminary Report on Patentability and Written Opinion of the International Searching Authority issued in International Patent Application No. PCT/CA2009/000797, mailed Dec. 6, 2010.

(Continued)

*Primary Examiner* — Nathaniel Wiehe
*Assistant Examiner* — Woody A Lee, Jr.
(74) *Attorney, Agent, or Firm* — McDermott Will & Emery LLP

(57) ABSTRACT

A fluid turbine apparatus which is able to increase the fluid velocity and consequently increase the rotation speed of the fluid turbine. The fluid turbine apparatus has a convergent section, a fluid turbine section and a divergent section. The fluid enters into the fluid turbine through the convergent section, passes through the fluid turbine and exits through the divergent section. The combination of the convergent section and the divergent section creates a Venturi effect and increases the fluid velocity and thus the energy density entering turbine for increasing the energy extracted by the turbine.

15 Claims, 4 Drawing Sheets

(56) References Cited

U.S. PATENT DOCUMENTS

| | | | |
|---|---|---|---|
| 6,756,696 | B2 | 6/2004 | Ohya et al. |
| 7,018,166 | B2 | 3/2006 | Gaskell |
| 7,094,018 | B2 | 8/2006 | Grubb |
| 7,147,428 | B2 | 12/2006 | Lamont |
| 7,479,709 | B2 | 1/2009 | Huisung et al. |
| 7,484,363 | B2 * | 2/2009 | Reidy et al. .................... 60/398 |
| 2007/0020097 | A1 | 1/2007 | Ursua |
| 2008/0061559 | A1 * | 3/2008 | Hirshberg ...................... 290/55 |

FOREIGN PATENT DOCUMENTS

| | | |
|---|---|---|
| FR | 2 491 557 | 4/1982 |
| GB | 2 430 982 A | 4/2007 |
| GB | 2 450 684 A | 1/2009 |
| WO | WO 98/32968 | 7/1998 |

OTHER PUBLICATIONS

Anzai, A., et al., "Wind Tunnel Analysis of Concentrators for Augmented Wind Turbines", Wind Engineering, 2004, pp. 605-614, vol. 28 No. 5.

Gilbert, B.L., et al., "Fluid Dynamics of Diffuser-Augmented Wind Turbines", Journal of Energy, 1978, pp. 368-374, vol. 2 No. 6.

Kirke, K.B., "Evaluation of Self-Starting Vertical Axis Wind Turbines For Stand-Alone Applications", Doctorate of Philosophy Thesis, School of Engineering Griffith University Gold Coast Campus, Apr. 1998.

Ohya, Y., et al., "Development of a High-Performance Wind Turbine Equipped with a Brimmed Diffuser Shroud", Transactions of the Japan Society for Aeronautical and Space Science, 2006, pp. 18-24, vol. 49 No. 163.

Phillips, D.G., et al., "Computational Modelling of Diffuser Designs for a Diffuser Augmented Wind Turbine", 13th Australasian Fluid Mechanics Conference, 1998, pp. 207-210, Monash University Melbourne Australia.

Sabzevari, A., et al., "Power Augmentation in a Ducted Savonius Rotor", Second International Symposium on Wind Energy Systems, 1978, pp. F3-25-F3-34, Paper F3.

Shikha, S., et al., "Air concentrating nozzles: a promising option for wind turbines", International Journal of Energy Technology and Policy, 2005, pp. 394-412, vol. 3 No. 4, Inderscience Enterprises Ltd.

De Laval nozzle, Wikipedia (online), Jun. 11, 2009, retrieve from the Internet: URL: http://en.wikipedia.org/wiki/De_Laval_nozzle.

* cited by examiner

TURBINE APPARATUS

RELATED APPLICATIONS

This application is the U.S. National Phase under 35 U.S.C. §371 of International Application No. PCT/CA2009/000797, filed on Jun. 5, 2009, which in turn claims the benefit of Canadian Application No. 2,633,876, filed on Jun. 5, 2008, the disclosures of which Applications are incorporated by reference herein.

FIELD OF THE INVENTION

The present invention generally relates to turbines and more particularly to an apparatus to increase the fluid velocity and consequently the amount of energy generated by a fluid turbine.

BACKGROUND OF THE INVENTION

There is a global interest in the development of alternative energy sources especially of wind power. The idea of harnessing the "free" energy in the air by using the passing wind to rotate a shaft in order to produce useful work has long been studied. During the past several years, however, the recognition of the limited supply of fossil fuels and the soaring costs of energy in general have created a renaissance in wind turbines all seeking to extract energy from the passing air with sufficient efficiency to constitute practical sources of electrical and mechanical power.

In its simplest form, a wind turbine comprises a shaft which carries blades or other means of catching the wind and rotating the shaft from which mechanical or electrical power is generated. Within given limits the velocity with which the shaft rotates is roughly proportional to the velocity of the wind acting on the shaft's rotators and to the amount of energy produced. The faster the shaft rotates for a given velocity of wind and a given load, the greater is the efficiency with which wind energy is converted into mechanical or electrical energy.

It has thus been one approach to increasing the efficiency of wind generating machines to increase the efficiency of the rotation of the working shaft for a given wind velocity.

The electrical power generated by wind turbines is often transmitted considerable distances to centres of population, and one reason for this is that people usually live in sheltered terrain where the wind resource is more modest. The less concentrated energy in the wind in such areas reduces the economics behind its energy capture with conventional wind turbines.

Several technical papers address these issues and cover the period between 1978 and 2006. Several patent documents use the word Venturi to describe the mechanism employed in the patent documents to improve the power output of the turbines. These patent documents cover principally hydraulic applications and no performance data is provided with the exception of a Japanese patent application for a wind turbine which employs a diffuser and brimmed inlet.

The application of diffusers to augment the performance of wind turbines has been on-going since the early 1970's. This technique lead to the acronym DAWT or Diffuser Assisted Wind Turbine. In most studies, the largest wind augmentation has been an increase in wind speed of 240%. This was obtained with a diffuser having a length to diameter ratio (L/D) of 4.5 to 1. Most modern turbines have very large diameters of the order of 90 meters. An increase in the wind speed of 240% would allow the use of a smaller rotor of say 45 meters. However the length of the required diffuser would be an unpractical 202.5 meters (45 meters×4.5=202.5).

As the three-bladed Horizontal Axis Wind Turbine (HAWT) is easily the world's accepted wind generating technology, it is evident that this type of turbine would be used in any DAWT application or experimentation. In fact, most of the documented experimental work to date with the intent of producing electrical power has been performed using a HAWT. Two papers refer to the use of a Savonius rotor. In spite of the acceptance of the HAWT, the Applicant could not find any reference to any experimentation using a convergent, ducted turbine tunnel and divergent for any HAWT application. Evidently, it appears that little or no work has been done to develop a new generation of wind turbines that would perform better than an HAWT or Savonius turbine in an augmented fluid stream.

In spite of the huge world demand for renewable wind energy there are no commercial applications of either diffuser-augmented, nor convergent-augmented, nor convergent-divergent augmented turbines. The reason is quite simple. To date, it has been much more cost effective to increase the swept area of the rotor to increase the power output than to increase the wind energy density using augmentation devices and use a smaller diameter rotor. As a corollary to this statement, one could add that no one has succeeded in increasing the wind energy density high enough to justify using augmentation devices and a smaller turbine rotor.

A first known prior art document is available on the Griffith University web Site and is a 1998 thesis entitled "*Evaluation of self starting vertical axis wind turbines for standalone applications*". In spite of an exhaustive literature review, no reference is made to using a convergent/divergent to augment VAWT performance nor is there any mention of using a diffuser or turbine ducting to increase performance. The vertical axis wind turbine is possibly the second most common commercial wind turbine. It would appear that everyone figures that if augmentation technology will not work with a HAWT, it will not work with any other type of turbine. Since publishing this thesis, the author and others have been working on a DAWT for hydraulic applications but again they are using a diffuser and a brimmed inlet without a convergent section.

A second known prior art document is a "*Wind Engineering*" dissertation paper from 2004 by the Ashikaga Institute of Technology entitled "*Wind Tunnel Analysis of Concentrators for Augmented Wind Turbines*". The abstract, line 3, discloses: "However most of the studies of the ducted rotor concern the effect of the diffuser while little research has been done concerning the concentrator (nozzle) This paper analyses the effect of the concentrator and its optimum design." It can be observed in this work that there is no talk of a diffuser and the wind turbine is a standard HAWT.

A third known prior art document is a "*Journal of Energy*" 1978 publication entitled "*Fluid Dynamics of Diffuser-Augmented Wind Turbines*". This paper by Gilbert B L, Oman R A and Foreman K M represents pioneering work performed on the development of a DAWT. Anyone who writes on this topic typically includes this paper as a reference. In the abstract, it is disclosed that "This first generation of DAWT can provide about twice the power of a conventional WECS with the same turbine diameter and wind." At this early stage, there was no use of a concentrator or ducting. A conventional HAWT was used. This work was completed when the diameter of a HAWT was much smaller than today as the composite materials used today were not available. In the 1980's, a company was created to use this technology. It went bankrupt while more or less convincing everyone that the future was in large diameter non-augmented turbines.

A fourth known prior art document is a publication from the "13*th Australian Fluid Mechanics Conference*" in 1998 entitled "*Computational Modelling of Diffuser Designs for a Diffuser Augmented Wind Turbine*". The work presented in the paper is performed using a brimmed inlet, diffuser and HAWT.

A fifth known prior art document is a publication of the "*International Journal of Energy*", in 2005 by CES, Indian Institute of Technology, entitled "*Air concentrating nozzles: A promising option for wind turbines*". In the conclusions of this paper, on page 411, second last paragraph, it is disclosed that "The greatest percentage improvement in the static torque by the use of the convergent nozzles occurs at low wind speeds." This is not an acceptable result as the large size of the equipment required to generate an equivalent amount of power obtainable at a higher wind speed will be uneconomical. The researchers did not use a divergent or ducted turbine tunnel and the trials were performed at very low wind speeds.

A sixth known prior art document is a publication from the "*Second International Symposium on Wind Energy Systems*", in 1978 by Pahvali University, Iran, entitled "*Power Augmentation in a ducted Savonius rotor*". In the summary, paragraph 1, it is disclosed that "Several ductings, concentrators and diffusers are examined and their effects on the performance characteristics of a split S Savonius rotor are presented in this paper." In the introduction, at point i, it is also disclosed that "While concentrators of the type (a) in FIG. 2 are quite ineffective, those of the type (b) in the same figure yield considerable improvement in the rotor performance." The conclusion of this report is that one convergent and two divergent sections are the most efficient combination for the Savonious turbine used. It also concludes that the concentrator should be offset with respect to the centerline of the ducted tunnel. However, current experimental work shows that at no time would it appear even remotely practical to use one convergent and two divergent sections. One can note that the improvement in performance is more related to the impingement of the air stream than the performance of the convergent and divergent sections themselves.

A seventh known prior art document is a publication of the "*Trans Japan Society for Aeronautical Space Science*", in 2006 by Kyushu University, Kasuga Japan entitled "*Development of a High Performance Wind Turbine Equipped with a Brimmed Diffuser Shroud*". The paper discloses the following (second phrase paragraph #1 and the last line of page 19):

3.1 Selection of a diffuser-type structure as the basic form
"We examined the flow of three typical hollow structures as shown in FIG. 2 namely a nozzle-type model that reduces the inside cross section, a cylindrical-type model that has a constant inside cross section and a diffuser type model that expands the inside cross section downstream.

As seen in FIG. 4(*a*) the wind tends to avoid the nozzle type model while the wind flows into the diffuser type model as it is inhaled as seen in FIG. 4(*b*)."

Essentially, this work suggests that nozzles and convergent sections should not be used as augmentation devices. This is the opposite to the findings of some current experimental work carried out by the Applicant.

"3.2 Improvement of acceleration performance of the diffuser structure by adding peripheral appendages (the first line of the second paragraph and the last paragraph of page 20):
"As a result of several attempts it was found that the wind speed is increased by adding an appropriate entrance (called an inlet shroud) and a ring type flange at the exit periphery (called a brim, see FIGS. 8, 9, 11 and 12) to the diffuser body. The effect of the inlet shroud is found in the following point. It restrains flow separation at the entrance fairly well and the wind flows in more smoothly."

This implies that the inlet shroud serves to minimise head loss at the entrance by reducing flow separation around the mouth of the inlet, as it does not increase the static pressure and as such is not an augmentation device. A nozzle and a convergent section are augmentation devices as they are designed to increase static pressure.

Other prior art patent documents known to the Applicant include U.S. Pat. No. 7,094,018, US 2007/0020097 A1, EP 0 935 068 A2, GB 2 430 982 A and U.S. Pat. No. 6,756,696 B2.

OBJECTS OF THE INVENTION

A first object of the present invention is to provide an apparatus to increase the energy generated by a fluid turbine.

A second object of the present invention is to provide an apparatus increasing the fluid velocity of the fluid entering a fluid turbine, and thus the energy density entering the turbine.

It is another object of the present invention to provide a fluid turbine apparatus which is usable in regions having relatively low fluid or wind velocity.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

An object of the present invention is to provide an apparatus that addresses at least one of the above-mentioned objects.

The aforesaid and other objectives of the present invention are realized by generally providing a turbine apparatus for use with a fluid turbine to increase the fluid velocity contacting the fluid turbine, the fluid turbine apparatus comprising:

a convergent section, the convergent section comprising an entry and an exit, the entry having an area higher than said exit, the convergent section having a first ratio being the entry area on the exit area;

a fluid turbine section adjacent to the exit of the convergent section, the fluid turbine section comprising the fluid turbine;

a divergent section adjacent to the fluid turbine section, the divergent section comprising an entry and an exit, the entry having an area lower than the exit, the divergent section having a second ratio being the exit area on the entry area;

wherein fluid enters through the convergent section and exits through the divergent section and wherein the fluid turbine apparatus has a third ratio being the exit area of the divergent section on the entry area of the convergent section.

The convergent section of the fluid turbine apparatus is defined as a section having an entry which is larger than its exit. The exit of the convergent section is in contact with the entry of the fluid turbine section. The length and the design of the convergent section are chosen to minimise the loss head due to the flow acceleration and to make uniform the velocity profile at the convergent exit so that a pressurisation is created at the entry of the fluid turbine section.

The divergent section is defined as a section having an entry which is smaller than its exit. The combination of the convergent section, the fluid turbine section and the divergent section must be such that a Venturi effect is created. The Venturi effect derives from a combination of Bernoulli's principle and the equation of continuity. Indeed, the fluid velocity must increase through the fluid turbine section, to satisfy the equation of continuity, while its pressure must decrease due to conservation of energy. The speed of fluid rise through the fluid turbine section, due to the pressure on the upwind side of the fluid turbine section, and the pressure drop on the downwind side as the fluid diverges to leave the fluid turbine section.

The parameters used to compare the convergent section and the divergent section are the first ratio, the second ratio and the third ratio. The first ratio is the ratio of the entry area over the exit area of the convergent section. The second ratio is the ratio of the exit area over the entry area of the divergent section. The third ratio is the ratio of the exit area of the divergent section over the entry area of the convergent section. There are also preferable ratios concerning the length of the convergent section and of the divergent section, which are the fourth ratio and the fifth ratio. The fourth ratio is the ratio of the length of the convergent section over the largest of the width or the height of the convergent section. The fifth ratio is the ratio of the length of the divergent section over the width of the divergent section.

It has been determined that the first ratio is preferably higher than 1.5 and more preferably higher than 2.25. It is important to get a pressure differential between the entry of the convergent section and the entry of the fluid turbine in order to maximize the Venturi effect created.

It has been determined that the second ratio is preferably higher than 4.0. It has been determined that the third ratio is preferably between 1.5 and 10, and more preferably between 1.5 and 6.5.

It has been determined that the fourth ratio is preferably between 0.5 and 2.5. The fifth ratio is preferably between 1.0 and 4.0. The length of the divergent section is preferably longer than the length of the convergent section.

In a preferred embodiment, the convergent shape is given by the Berger theory as well as the inflexion point and the length in order to minimise the loss head and make uniform the velocity profile at the convergent exit.

The shape of the cross-section of the different sections may vary (circular, rectangular, etc.). However, the shape of the cross-section of the divergent section should preferably be similar to the shape of the cross-section of the exit of the fluid turbine section to keep a laminar flow in the divergent section.

It is to be noted that the fluid turbine section may have a shape that differs from the divergent section and/or the convergent section. In this case a transition section is installed between the fluid turbine section and the divergent section and/or the convergent section to preserve a laminar flow.

In a further embodiment, the convergent section comprises two flat walls that are parallel to each other and two other walls that are curved to form a constriction of section.

The angle between the walls of the divergent section and the longitudinal axis of the fluid turbine apparatus should be chosen to prevent a stall of the fluid. A stall is a condition in aerodynamics where the angle between the relative incoming fluid and the surface on which the fluid flows increases beyond a certain point such that the fluid stops to follow the profile of the surface (in this case the walls of the divergent section). It is preferable to maintain a laminar flow within the divergent section because a turbulent flow in this section would decrease the fluid velocity and consequently the efficiency of the fluid turbine. The angle at which a turbulent flow occurs is referred to as the critical angle. The critical angle is dependant upon the profile and the geometry of the surfaces of the divergent section. The critical angle may vary but is preferably greater than 8 degrees and less than 30 degrees relative to the incoming fluid. It is to be noted that the different walls of the divergent do not need to be all at the same angle relatively to the longitudinal axis of the fluid turbine apparatus but all should be within the aforesaid parameters.

In a further embodiment, the entry of the convergent section and the exit of the divergent section comprise panels to minimize the entrance losses and the exit losses. In order to minimize the entrance losses and the exit losses, the panels should preferably have a smooth profile and be tangential to the fluid turbine apparatus. A smooth profile refers to a profile that does not have sharp edges.

The fluid turbine section is preferably only slightly larger than the overall size of the fluid turbine so as to force the fluid to pass through the fluid turbine and not around the fluid turbine. The space between the inside walls of the fluid turbine section and the fluid turbine is preferably just what is needed so that the fluid turbine will not touch the walls and allowing the fluid turbine to rotate without resistance. Indeed, if a large space is kept between the fluid turbine and the walls of the fluid turbine section, a portion of the fluid will pass where there is less resistance or around the fluid turbine and therefore reduce its efficiency.

In a further embodiment, the orientation of the entire fluid turbine apparatus may be rotatable so that the longitudinal axis of the fluid turbine apparatus is parallel to the actual flow of the fluid. This rotation allows the maintenance of the alignment of the centerline of the convergent parallel to the direction of the prevailing fluid. The fluid turbine section, the convergent section and the divergent section are mounted together as one assembly that rotates 360 degrees around a central axis. For example, the fluid turbine apparatus may sit on a support connected to a mechanism that is able to rotate. The mechanism may comprise wheels, rollers or the like, located between the fluid turbine apparatus and the support, that follow a circular track and that are possibly motorized to maintain precise positioning. In high fluid conditions, the pressure of the fluid against the wall of the divergent is sufficient to keep the unit aligned parallel to the fluid. The fluid apparatus can be installed on a tower or a rooftop. It is to be noted that other means that the examples detailed in the present document may be provided so that the fluid turbine apparatus rotates in such a way as to insure that the longitudinal axis of the fluid turbine apparatus is parallel to the actual flow of the fluid.

The material of the fluid turbine apparatus should be resistant enough to support its own weight. The material, or the combination of materials, may be, for example, metal, composite or polymers. The fluid turbine apparatus may, for example, be made of aluminum and comprises structural reinforcement made of steel. Structural reinforcements may be used to support the fluid turbine apparatus.

Depending on the desired capacity of the turbine, the dimensions of the convergent and divergent can be considerable. A large proportion of their weight and the forces generated against the walls by the fluid can be supported by a central mast and cable structure. The mast is part of the assembly and rotates with the assembly to keep the convergent facing the fluid. The overall appearance of the mast and cables resembles that of a section of a suspension bridge that rotates around the middle.

Preferably, the fluid turbine is a wind turbine, water turbine or steam turbine.

Hence, a smaller wind turbine apparatus may be installed on roofs and/or near populated centers.

The wind turbine apparatus of the present invention may be used in a plurality of environments, even where there is no high velocity wind. The wind turbine apparatus of the present invention generates less noise than usual wind turbines because the wind turbine is enclosed in the wind turbine apparatus. It is thus possible to install the wind turbine apparatus of the present invention near population. It could be possible to install the wind turbine apparatus on roof of buildings.

In a further embodiment, the wind turbine section could comprise more than one turbine. It is to be noted that there is less energy available for each supplementary wind turbine, indeed, the wind velocity is smaller at the exit of a wind turbine than at the entry. If a plurality of wind turbines are comprised in the wind turbine section, the characteristics of the wind turbine apparatus should be carefully chosen so that there is still a Venturi effect induced on the wind turbines.

The features of the present invention which are believed to be novel are set forth with particularity in the appended claims.

BRIEF DESCRIPTION OF THE DRAWINGS

These and other objects and advantages of the invention will become apparent upon reading the detailed description and upon referring to the drawings in which.

Figure 1:
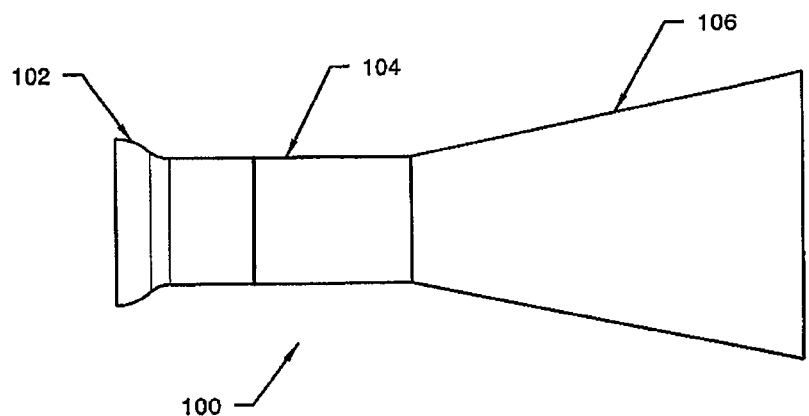
FIG. 1 is a schematic view of the fluid turbine apparatus.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

DESCRIPTION OF A PREFERRED EMBODIMENT

In the following description, similar features in the drawings have been given similar reference numerals and in order to weight down the figures, some elements are not referred to in some figures if they were already identified in a precedent figure.

A novel fluid turbine apparatus will be described hereinafter. Although the invention is described in terms of specific illustrative embodiment(s), it is to be understood that the embodiment(s) described herein are by way of example only and that the scope of the invention is not intended to be limited thereby.

Figure 2:
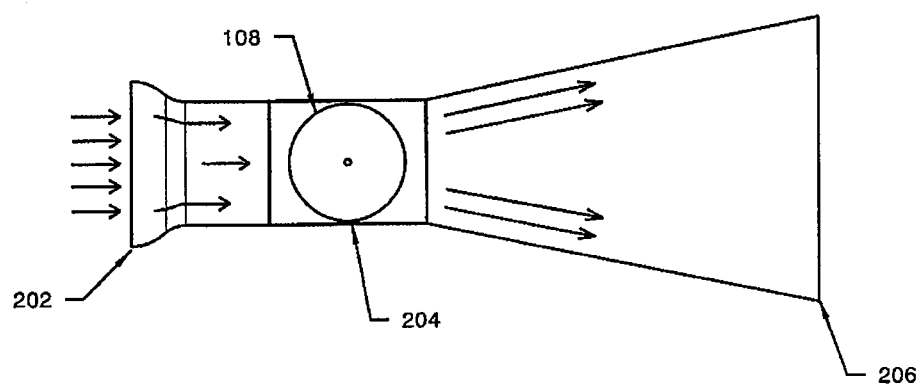
FIG. 2 is a schematic cross-section view of the present invention showing the direction of the fluid and places where the superficies are calculated.

FIG. 1 shows the principal sections of the fluid turbine apparatus 100 which are the convergent section 102, the fluid turbine section 104 and the divergent section 106. As shown in FIG. 2, the fluid (illustrated by the arrows) enters into the fluid turbine apparatus 100 through the convergent section 102 and exits at the end of the divergent section 106. The fluid passes through the fluid turbine 108.

Four embodiments of the present invention are described in the non limitative following examples that are simulations executed in a wind tunnel.

The examples described here below have been executed in a low velocity refrigerated wind tunnel in a closed loop operating at sea level. The wind tunnel test section in which the simulations are realized is 0.914 meters wide by 0.762 meters high. The temperature during the simulation was set to the ambient temperature, 20° C. The wind velocity for these examples is of 8 m/s (meter/second).

In each example, the static pressure is measured during a simulation at the entry of the wind turbine section 204 and at the entry of the convergent section 202. A pressure sensor is disposed at each of these places during each simulation. The average wind velocity at the entry of the wind turbine section, 204, is calculated using the static pressures and the Bernoulli equation.

To determine the effect of the fluid turbine apparatus, simulations have been executed with the fluid turbine apparatus but without the fluid turbine. Thus it is possible to compare the fluid velocity with and without the fluid turbine. To evaluate the wind augmentation ratio of the wind turbine section, the wind velocity calculated for the wind turbine section (as shown in FIG. 2) is compared to the wind velocity in the refrigerated wind tunnel test section.

The dimensions of the fluid turbine section in which the simulations were realized are indicated in the Table 1 below. The fluid turbine used for the simulations is a vertical axis turbine (see Table 2). The fluid turbine is composed of two aluminium disks of 3,175 mm thick and three wooden blades, extending between the disks, of 9.21 cm length. The blades have a symmetrical airfoil shape, technically known as the NACA 0015 profile where the blade thickness is 15% of the blade chord.

TABLE 1

Characteristics of the wind turbine section

|  | Units | Wind Turbine Section |
|---|---|---|
| Height | cm | 10.16 |
| Width | cm | 29.85 |
| Length | cm | 38.38 |
| Area | cm$^2$ | 303.23 |

TABLE 2

Characteristics of an embodiment of the wind turbine

|  | Units | Turbine |
|---|---|---|
| Height | cm | 9.84 |
| Diameter | cm | 29.21 |
| Type | — | NACA 0015 |
| Chord | cm | 5.08 |
| Blade | — | 3 |

As the person skilled in the art would understand, a plurality of types of wind turbines may be used with the device of the present invention, for example, a horizontal axis wind turbine or a vertical axis wind turbine. Also, for each wind turbine, different combinations may be used, for example a different number and/or configuration of blades, the space between the wind turbine section and the wind turbine, etc.

As the person skilled in the art would understand, the parameters of the convergent section and of the divergent section may differ than the examples shown in this document.

Similarly, the wind turbine section may differ depending of the wind turbine used with the wind turbine apparatus.

Figure 3A:
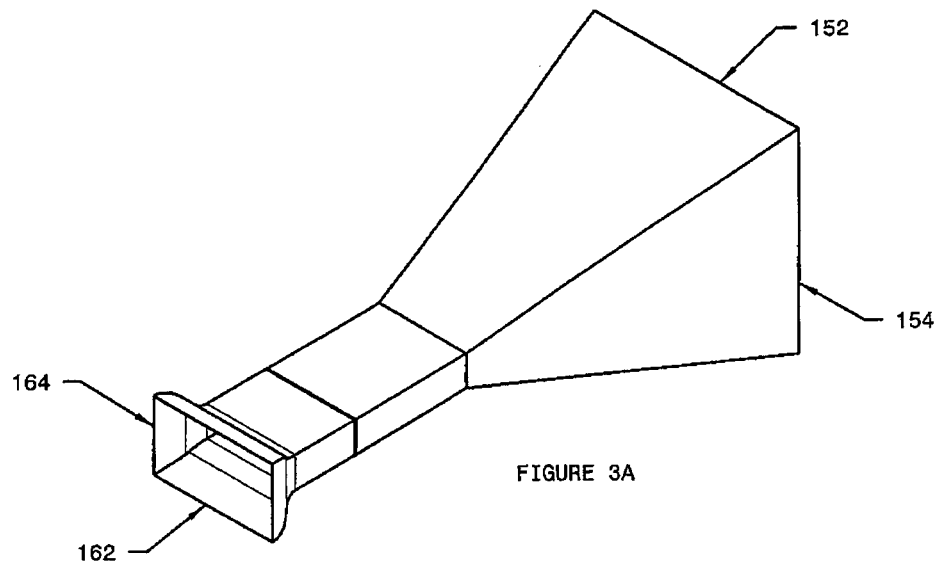
FIGS. 3a to 3c are a perspective view, a top view and a side view illustrating the parameters of the fluid turbine apparatus.
Figure 3B:
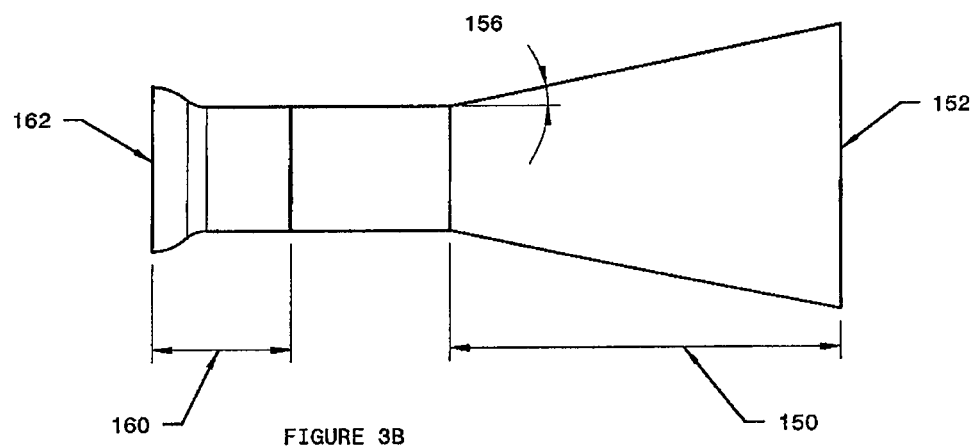
Figure 3C:
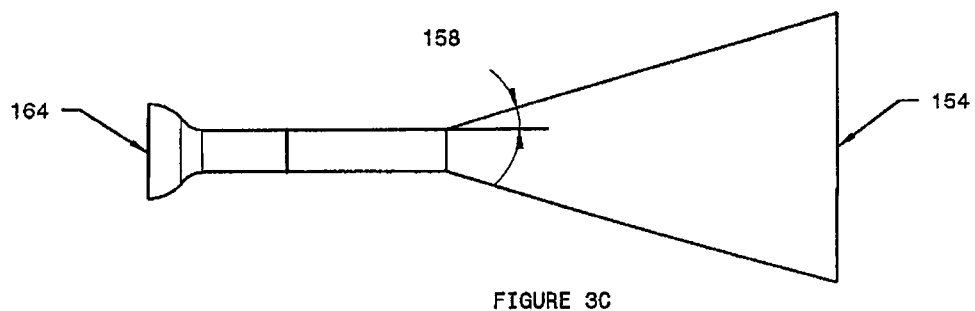

The following examples have been executed with two types of convergent sections and two types of divergent sections, their characteristics being detailed in Tables 3 to 6. FIGS. 3a to 3c illustrate the parameters of the convergent section and of the divergent section. The convergent section has a length 160, a width 162 and a height 164. The divergent section has a length 150, a width 152, a height 154, a vertical angle 158 and a horizontal angle 156.

TABLE 3

Characteristics of the first embodiment of the convergent section, also referred to as C2

|  | Units | Convergent section C2 | |
|---|---|---|---|
|  |  | Entry | Exit |
| Height | cm | 17.78 | 10.16 |
| Width | cm | 38.38 | 29.85 |
| Length | cm | 30.91 | |
| Area | cm² | 682.39 | 303.23 |
| Cont. factor of C2 | — | | 2.25 |

TABLE 4

Characteristics of the second embodiment of the convergent section, also referred to as C3

|  | Units | Convergent section C3 | |
|---|---|---|---|
|  |  | Entry | Exit |
| Height | cm | 22.86 | 10.16 |
| Width | cm | 39.80 | 29.85 |
| Length | cm | 32.79 | |
| Area | cm² | 909.87 | 303.23 |
| Cont. factor of C3 | — | | 3 |

TABLE 5

Characteristics of the first embodiment of the divergent section, also referred to as D2

|  | Units | Divergent section D2 | |
|---|---|---|---|
|  |  | Entry | Exit |
| Height | cm | 10.16 | 58.75 |
| Width | cm | 29.85 | 60.33 |
| Area | cm² | 303.23 | 3544.11 |
| Length | cm |  | 93.98 |
| Vertical Angle | ° |  | 14.50 |
| Horizontal Angle | ° |  | 9.20 |
| Cont. factor of D2 | — |  | 11.69 |
| Cont. factor C2-D2 | — |  | 5.19 |
| Cont. factor C3-D2 | — |  | 3.90 |

TABLE 6

Characteristics of the second embodiment of the divergent section, also referred to as D3

|  | Units | Divergent section D3 | |
|---|---|---|---|
|  |  | Entry | Exit |
| Height | cm | 10.16 | 65.74 |
| Width | cm | 29.85 | 67.31 |
| Area | cm² | 303.23 | 4424.64 |
| Length | cm |  | 93.98 |
| Vertical Angle | ° |  | 16.45 |
| Horizontal Angle | ° |  | 11.25 |
| Cont. factor of D3 | — |  | 14.59 |
| Cont. factor C2-D3 | — |  | 6.48 |
| Cont. factor C3-D3 | — |  | 4.86 |

EXAMPLE 1

In this first example, a C2 convergent section is used with a D3 divergent section. The first ratio is 2.25, the second ratio is 14.59 and the third ratio is 6.48. The speed velocity between the entry of the convergent section 102 and the wind turbine section 104 has increased by a factor of 2.06 and the rotation of the wind turbine is of 418 rpm (rotation per minute).

EXAMPLE 2

In the second example, a C3 convergent section is used with a D3 divergent section. The first ratio is 3, the second ratio is 14.59 and the third ratio is 4.86. The speed velocity between the entry of the convergent section 102 and the wind turbine section 104 has increased by a factor of 2.21 and the rotation of the wind turbine is of 431 rpm (rotation per minute).

EXAMPLE 3

In this third example, a C2 convergent section is used with a D2 divergent section. The first ratio is 2.25, the second ratio is 11.69 and the third ratio is 5.19. The speed velocity between the entry of the convergent section 102 and the wind turbine section 104 has increased by a factor of 1.67 and the rotation of the wind turbine is of 300 rpm (rotation per minute).

EXAMPLE 4

In this last example, a C3 convergent section is used with a D2 divergent section. The first ratio 3.00, the second ratio is 11.69 and the third ratio is 3.90. The speed velocity between the entry of the convergent section 102 and the wind turbine section 104 has increased by a factor of 1.76 and the rotation of the wind turbine is of 428 rpm (rotation per minute).

Figure 4:
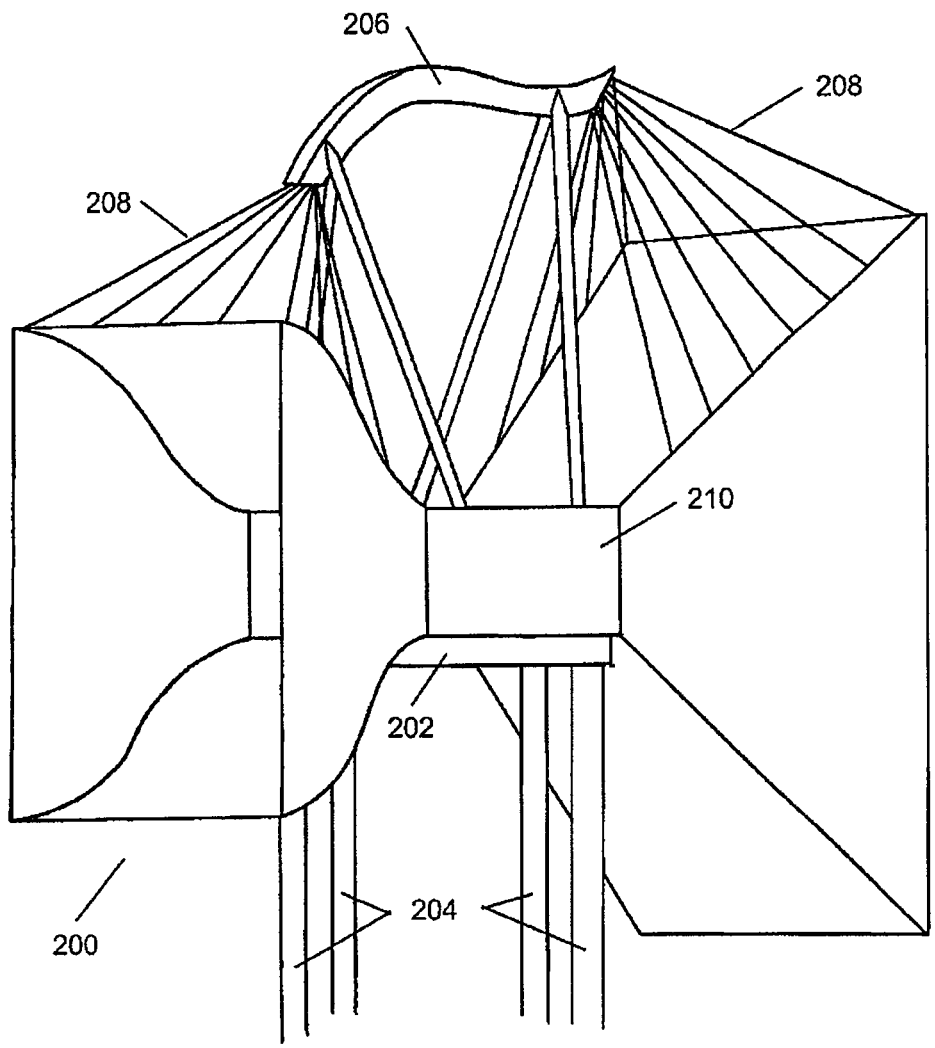
FIG. 4 is a perspective view showing the fluid turbine apparatus mounted on support plate and supported by a mast.

In FIG. 4, the wind turbine section 210 of the wind turbine apparatus 200 is disposed on a support 202. The support 202 is mounted on legs 204. A rotating mechanism (not shown) is located between the wind turbine section 210 and the support plate 202, allowing the wind turbine apparatus 200 to rotate. The embodiment shown in FIG. 4 further comprises a mast 206 and cables 208.

Figure 5:
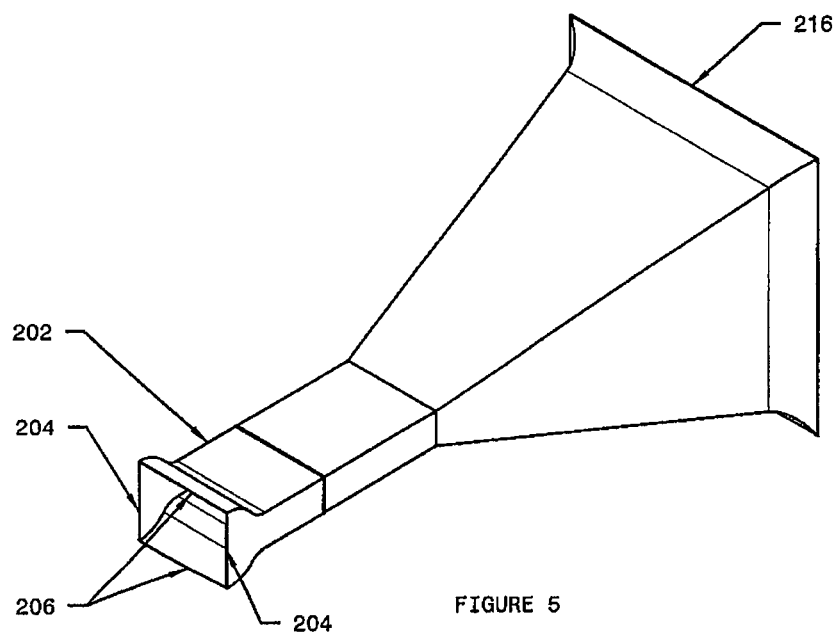
FIG. 5 is a perspective view of another embodiment of the fluid turbine apparatus.

FIG. 5 illustrates another embodiment of the convergent section 202. The latter comprises two flat walls 204 and two curved walls 206.

Figure 6:
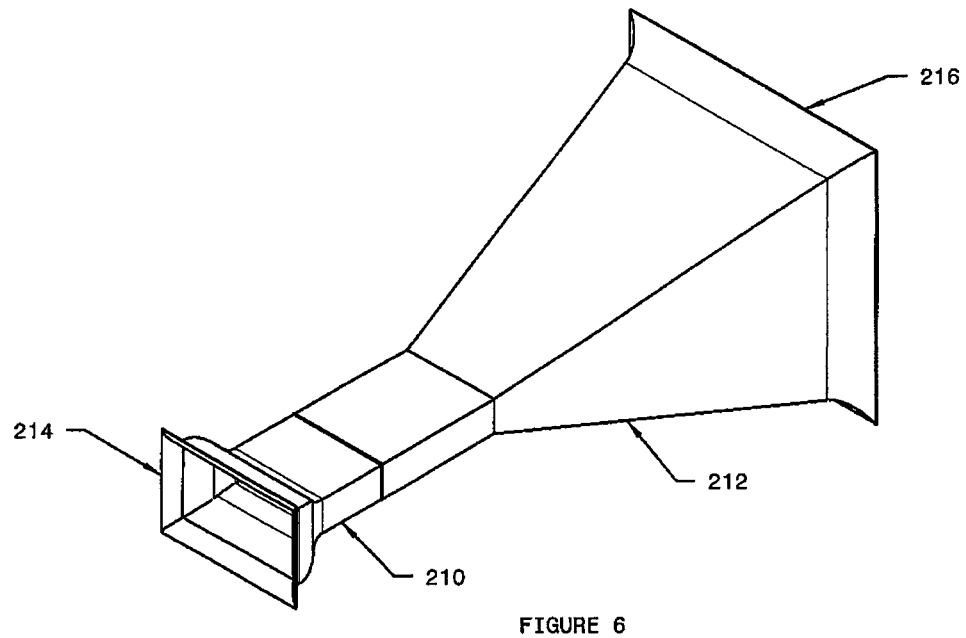
FIG. 6 is a perspective view of an embodiment of the fluid turbine apparatus comprising entry panels and exit panels.

Now referring to FIG. 6, the fluid turbine apparatus further comprises entry panels 214 and exit panels 216 connected respectively to the convergent section 210 and to the divergent section 212.

The claimed invention is based on experimental work carried out in a university research wind tunnel by qualified specialists in the field of aeronautics. This work now allows one to determine configurations of assemblies of convergent and divergent sections sized to function in parallel with an optimal result in terms of augmentation in energy density.

This work requires determining ratios between the inlet and outlet surfaces of the convergent and divergent sections. It is the optimisation of these ratios that in turn provide a significant additional augmentation in energy density of the air stream at the face of the turbine rotor. The experimental results obtained in terms of increase in fluid energy density are much higher than those documented to date.

It is the optimum relative size configurations of the assemblies for the maximisation of the augmentation in energy density (or fluid mass velocity) of a fluid stream by "convergent—ducted turbine section—divergent" that is the basis for the claimed invention. The Applicant considers that the results of his work will lead to a new generation of augmented wind turbines.

One of the effects of the improvement in the overall efficiency of the convergent-divergent sections is to provide superior results with a much shorter divergent section. Much of the experimental work performed with diffusers alone have led to diffuser lengths that are much too long to be commercially practical for augmented turbines. In fact, the improvement in energy production at any given wind speed is now sufficient to make it cost effective to use augmentation and smaller diameter rotors to produce electrical energy at a cheaper cost than from non-augmented turbines.

Although some work has been performed by researchers in Iran in 1978, using a convergent—ducted Savonius turbine—divergent as mentioned above, this type of rotor is unsuitable for power production. The tip speed of the rotor is too low as it turns at the speed of the wind in the tunnel and the high torque developed at low speeds makes it more suitable for applications involving the pumping of fluids.

The term "divergent section" rather than diffuser is used to describe the apparatus connecting the discharge of a ducted turbine section to the atmosphere while the entrance of the aforementioned turbine section is pressurised by a convergent section. A diffuser is connected to a ducted turbine section that may or may not include a brimmed entrance and is non-pressurized. This implies that, in the case of a diffuser, the maximum air pressure at the face of the rotor is equal or less than the nominal static head provided by the wind.

As mentioned, a divergent section operates in parallel with a convergent section that serves to pressurise the entrance of the ducted turbine section. As such, the static head at the face of the rotor is higher than the nominal static head provided by the wind. Both the convergent and divergent sections are designed to minimise their respective boundary layer losses over their lengths, which in turn maximise their efficiency in terms of increasing the energy density of the air stream at the turbine rotor.

In the context of augmentation devices, a nozzle is a straight-walled or curved-wall device that decreases in cross sectional area over its length. Boundary layer separation and the ratio of the size of the convergent section to the size of the divergent section are not normally important design criteria. As shown through the results of previous research, this lack of design criteria often results in a nozzle that blocks the air flow to the turbine rotor. Rather than increase static head at the rotor, it decreases it.

This effect is well demonstrated in the experimental results of the Applicant. In the first series of tests, the size of the divergent is held constant. When the size of the convergent intake area is increased from 3.0 to 5.8 times the size of the ducted tunnel inlet the performance of the system decreased from a wind augmentation ratio of 2.85 to a ratio of 2.40.

In some instances; within the above-described technical papers from the prior art, the augmentation mechanism consists of a brimmed inlet used with a diffuser. The brimmed inlet serves to decrease the loss of static pressure due to entrance effects. It cannot increase static pressure at the rotor above that available from the wind. For this reason a brimmed inlet is not considered an augmentation device as is a nozzle or a convergent section.

The principle of the flow Venturi has existed for centuries and is a mechanism used frequently for flow measurement. The basic elements of a flow Venturi for measurement are a convergent section, a ducted tunnel and a divergent section. In the case of a measuring device, the flow regime is almost always pressurised by mechanical devices (pumps, fans, compressors, etc.) and a maximum increase in energy density through the Venturi is not a critical operating element and, they are not designed for low static heads as experienced in power generation applications.

In the case of energy generation from a fluid stream that offers a low static head, the essential role of the convergent and divergent sections is to maximise the fluid energy density in the ducted turbine section. The generation of a maximum energy density requires certain size configurations or ratios between the convergent-ducted turbine tunnel and divergent which are claimed hereinbelow.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A fluid turbine apparatus for use with at least one fluid turbine to increase the fluid velocity contacting said fluid turbine, said fluid turbine apparatus comprising:

a convergent section, said convergent section comprising an entry and an exit, said entry having an area higher than said exit, said convergent section having a first ratio being the entry area over the exit area;

a fluid turbine section adjacent to said exit of said convergent section, said fluid turbine section comprising said at least one fluid turbine;

a divergent section adjacent to said fluid turbine section, said divergent section comprising an entry and an exit, said entry having an area lower than said exit, said divergent section having a second ratio being the exit area over the entry area;

wherein at least one of the convergent section and the divergent section comprises a rectangular cross-section, wherein all fluid contacting said fluid turbine enters through said convergent section and exits through said divergent section and wherein said fluid turbine apparatus has a third ratio being said exit area of said divergent section over said entry area of said convergent section, and wherein said first ratio is higher than 1.5, said second ratio is higher than 4.0 and said third ratio is comprised between 1.5 and 10.

2. The fluid turbine apparatus as claimed in claim 1, wherein said convergent section has a length and a width and wherein said fluid turbine apparatus has a fourth ratio being said length of said convergent over said width of said convergent, said ratio being comprised between 0.5 and 2.5.

3. The fluid turbine apparatus as claimed in claim 1, wherein said divergent section has a length and a width and wherein said fluid turbine apparatus has a fifth ratio being said length of said divergent over said width of said divergent, said ratio being comprised between 1.0 and 4.0.

4. The fluid turbine apparatus as claimed in claim 1, wherein said convergent section has a length and said divergent has a length, said divergent length being higher than said convergent length.

5. The fluid turbine apparatus as claimed in claim 1, wherein, in use, the fluid velocity profile is uniform at said exit of said convergent.

6. The fluid turbine apparatus as claimed in claim 1, wherein the angle between a longitudinal axis of the fluid turbine apparatus and each of the walls of said divergent is comprised between eight degrees and thirty degrees.

7. The fluid turbine apparatus as claimed in claim 1, wherein said convergent section comprises two walls that are flat and parallels to each other and two other walls that are curved to form a constriction.

8. The fluid turbine apparatus as claimed in claim 1, further comprising entry panels that are adjacent and tangential to said convergent section.

9. The fluid turbine apparatus as claimed in claim 1, further comprising exit panels that are adjacent and tangential to said divergent section.

10. The fluid turbine apparatus as claimed in claim 1, wherein said fluid turbine apparatus comprises a longitudinal axis and wherein said wind turbine apparatus may be rotated so that said longitudinal axis is parallel to an incoming direction of the fluid.

11. The fluid turbine apparatus as claimed in claim 1, further comprising a support comprising rotating mechanism on which said fluid turbine apparatus is disposed.

12. The fluid turbine apparatus as claimed in claim 1, further comprising structural reinforcement.

13. The fluid turbine apparatus as claimed in claim 12, wherein said structural reinforcement comprises a mast and a plurality of cables connecting said mast to an external structure of the fluid turbine apparatus.

14. The fluid turbine apparatus as claimed in claim 1, wherein the fluid turbine is selected from the group consisting of wind turbines, water turbines and steam turbines.

15. The fluid turbine apparatus as claimed in claim 10, wherein the fluid turbine is a wind turbine.

* * * * *